United States Patent
Christiansen

(10) Patent No.: US 11,346,327 B2
(45) Date of Patent: May 31, 2022

(54) WIND TURBINE

(71) Applicant: Siemens Gamesa Renewable Energy A/S, Brande (DK)

(72) Inventor: Poul Christiansen, Them (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 297 days.

(21) Appl. No.: 16/579,352

(22) Filed: Sep. 23, 2019

(65) Prior Publication Data
US 2020/0102937 A1    Apr. 2, 2020

(30) Foreign Application Priority Data
Sep. 27, 2018   (EP) .................................. 18197215

(51) Int. Cl.
| | |
|---|---|
| F03D 80/30 | (2016.01) |
| F03D 80/70 | (2016.01) |
| F03D 1/06 | (2006.01) |
| H02G 13/00 | (2006.01) |

(52) U.S. Cl.
CPC ........... F03D 80/30 (2016.05); F03D 1/0666 (2013.01); F03D 80/70 (2016.05); H02G 13/80 (2013.01)

(58) Field of Classification Search
CPC ........ F03D 80/30; F03D 80/82; F03D 1/0666; F03D 80/70; H02K 11/40; H02G 13/40; H02G 13/80
USPC ....... 174/50, 520, 59, 2, 5 R, 5 SG, 7, 17 R, 174/51, 3, 6
See application file for complete search history.

(56) References Cited

U.S. PATENT DOCUMENTS

| | | | |
|---|---|---|---|
| 4,625,256 A | 11/1986 | Scuka et al. | |
| 8,643,997 B2 | 2/2014 | Lyngby et al. | |
| 8,873,214 B2 * | 10/2014 | Catchpole | H02G 13/60 |
| | | | 361/220 |

(Continued)

FOREIGN PATENT DOCUMENTS

| | | |
|---|---|---|
| CN | 103603775 A | 2/2014 |
| CN | 104066984 A | 9/2014 |

(Continued)

OTHER PUBLICATIONS

European Search Report dated Apr. 2, 2019 for Application No. 18197215.9.

(Continued)

*Primary Examiner* — Christopher R Legendre
(74) *Attorney, Agent, or Firm* — Schmeiser, Olsen & Watts LLP

(57) ABSTRACT

A wind turbine includes a hub connected to a rotatable shaft extending in an axial direction and at least one bearing supporting the shaft against a housing, wherein the housing includes an electrically conductive cage section, which surrounds at least partially an axial segment of the shaft, wherein the cage section is connected to the shaft by at least one first conduction means and at least one second conduction means, wherein the at least one first conduction means and the at least one second conduction means are arranged spaced both from each other in the axial direction, wherein the at least one bearing is arranged between the segment of the shaft and the cage section of the housing at an axial position in between the at least one first conduction means and the at least one second con-duction means.

14 Claims, 6 Drawing Sheets

(56) References Cited

U.S. PATENT DOCUMENTS

| | | | | |
|---|---|---|---|---|
| 9,181,927 B2* | 11/2015 | Lewke | | F03D 80/30 |
| 9,188,196 B2* | 11/2015 | Vath | | F03D 80/85 |
| 2013/0336786 A1* | 12/2013 | Kissinger | | F03D 17/00 |
| | | | | 416/1 |
| 2014/0341741 A1 | 11/2014 | Nieuwenhuizen | | |
| 2016/0273521 A1 | 9/2016 | Huang et al. | | |
| 2020/0102937 A1* | 4/2020 | Christiansen | | F03D 1/0666 |

FOREIGN PATENT DOCUMENTS

| | | | | |
|---|---|---|---|---|
| CN | 204253289 U | 4/2015 | | |
| DE | 102007052525 A1 | 5/2009 | | |
| EP | 0121546 A1 | 10/1984 | | |
| EP | 2336560 A1 | 6/2011 | | |
| FR | 2933544 A1 * | 1/2010 | | H02K 11/40 |
| NO | 20075720 L | 6/2009 | | |
| SE | 429279 B | 8/1983 | | |
| WO | 2009061209 A1 | 5/2009 | | |

OTHER PUBLICATIONS

Non-English Chinese Office Action for Application No. 201901923157.4, dated Oct. 30, 2020.

* cited by examiner

WIND TURBINE

CROSS-REFERENCE TO RELATED APPLICATIONS

This application claims priority to EP Application No. 18197215.9, having a filing date of Sep. 27, 2018, the entire contents of which are hereby incorporated by reference.

FIELD OF TECHNOLOGY

The following relates to a wind turbine comprising a hub connected to a rotatable shaft extending in an axial direction and at least one bearing supporting the shaft against a housing, wherein the housing comprises an electrically conductive cage section, which surrounds at least partially an axial segment of the shaft.

BACKGROUND

Both offshore and onshore wind turbines are taller than the structures or the vegetation in their surroundings, so that they are very exposed to be struck by lightning. In most cases, the lightning hits one of the rotor blades of the wind turbine and is then conducted via the wind turbine blade to the hub of the wind turbine and then to the ground via the shaft, the housing and the tower of the wind turbine. Further, the lightning induces large currents flowing through the wind turbine. Since these large currents may vary quickly over time, also large voltage differences between components of the wind turbine may be induced. Such a large voltage difference can entail a risk of damage to the components, especially to components like bearings, which connect parts that are subject to the current flow induced by a lightning strike like the shaft and the housing. A huge voltage difference dropping over a bearing may cause an undesired current flow through the bearing which may damage or even destroy the bearing and consequently also the functionality of the wind turbine.

Since the occurrence of lightning strikes to wind turbine blades cannot be prevented, it is desirable that wind turbines are constructed in such a manner that they are more resistant to lightning strikes and that damage to vulnerable components like bearings become less likely.

SUMMARY

An aspect relates to providing a wind turbine with an improved protection of its at least one bearing from lightning-induced damage.

According to embodiments of the invention, this aspect is achieved by a wind turbine as initially described, wherein the cage section is connected to the shaft by at least one first conduction means and at least one second conduction means, wherein the at least one first conduction means and the at least one second conduction means are arranged spaced both from each other in the axial direction, wherein the at least one bearing is arranged between the segment of the shaft and the cage section of the housing at an axial position in between the at least one first conduction means and the at least one second conduction means.

The connection between the cage section and the shaft is especially an electrical connection, which persists at least during the conduction of large currents, in particular lightning-induced currents, in the wind turbine. The cage section of the housing and the shaft may be permanently electrically connected to each other. It is also possible that the electrical connection between the cage section and the shaft is established during the occurrence of large currents in the wind turbine, for instance by including one or more small air gaps, which are normally insulating but which are bridged by a breakdown, in particular by arc formation, and become therefore conductive for instance during grounding of a lightning-induced current.

The connection between the cage section and the shaft is created by the at least one first conduction means and the at least one second conduction means. The at least one first conduction means and the at least one second conduction means are separated in the axial direction of the shaft, so that the shaft segment in-between the at least one first conduction means and the at least one second conduction means is connected parallel to the cage section of the housing.

The cage section surrounding the segment of the shaft as well as the conduction means may form a Faraday cage. Consequently, the at least one bearing, which is arranged at an axial position between the at least one first conduction means and the at least one second conduction means and supports the shaft in particular against the cage section of the housing, is protected in case of a lightning strike. The lightning strike normally hits the rotor blades of the wind turbine and is conducted through the rotor blade to the hub. From the hub, the lightning current flows through the shaft of the wind turbine. By the first conduction means, the current can flow partly in the cage section of the housing, which is grounded for instance via a bedframe of the housing connected to the tower and therefore to the ground. Part of the current may still flow through the shaft, wherein a grounding of this part of the current may occur through the at least one second conduction means, which is also connected to the cage section of the housing and therefore via the bedframe and the tower to the ground. The second conduction means may also work as a termination for the current path through the shaft reducing or preventing a reflection of the current on the end of the shaft opposite to the hub.

For the segment of the shaft, the electrically conductive cage section acts as a coaxial shielding with a low transfer impedance between the first and the second conduction means to the shaft, so that a large current in the cage section only causes a small voltage difference between the shaft and the cage section and therefore also over a bearing which is arranged in between the shaft and the cage section.

The housing of the wind turbine can form a nacelle of the wind turbine or it can be part of a housing arrangement forming the nacelle. The electrically conductive cage section is part of the housing and is for instance a main frame of the housing and/or the nacelle. The electrically conductive cage section can be supported directly on a bedframe of the housing, wherein the bedframe is supported on the tower of the wind turbine.

In an exemplary embodiment of the invention, the first conduction means may comprise an electrically conductive plate member with a circular opening surrounding the shaft, wherein the opening comprises a diameter larger than the diameter of the shaft so that at least partially a gap between the outer circumference of the shaft and the opening of the plate member is formed. The gap between the shaft and the, in particular ring-shaped, plate member can form a spark gap, which can be bridged by a comparatively low voltage difference between the shaft and the plate member. The spark gap can be bridged by arcing, which makes the connection between the shaft and the cage section via the first conduction means electrically conductive.

The breakdown voltage of the gap, or the voltage which induces arcing in the gap, respectively, makes the first conduction means electrically conductive. This voltage depends on the width of the gap and on other parameters, for instance on air humidity and the like, and can for instance have a magnitude around 1 kV. Such a voltage is, compared to the voltage differences which may appear during lightning strikes, relatively low. In particular, in standard operating conditions at the site of the wind turbine, the breakdown voltage may be lower than 1 kV.

For keeping also the voltage difference between the shaft and the cage section low, it is desirable for the at least one first conduction means to have a low self-induction. Since lightning-induced currents may change rapidly over time, or have a large di(t)/dt, respectively, only a small voltage drops over the first conduction means, or between the shaft and the cage section, respectively, if the self-induction of the at least one first conduction means is low. Consequently, also the voltage drop over a bearing arranged between the segment of the shaft and the cage section remains low and the bearing is protected. By using a plate member for the at least one first conduction means, a low self-induction can be achieved.

Additionally, according to embodiments of the invention, the outer circumference of the plate member may be attached to an electrically conductive flexible member, in particular a flexible metal membrane or a flexible metal mesh, wherein the flexible member is attached to the cage section of the housing. The outer circumference of the plate member has the same shape as the outer circumference of the cage section of the housing. This can be, for instance, a circular geometry, wherein the cage section of the housing may comprise a cylindrical geometry, wherein the circular plate member is attached to one of the circular end faces using the electrically conductive flexible member. The flexibility of the flexible member and therefore the flexibility of the attachment of the plate member to the cage section of the housing allows for compensating of shaft bending, which may occur during operation of the wind turbine. Since the flexible member is electrically conductive, a current flowing from the shaft through the plate member can be conducted from the plate member into the cage section of the housing.

In an exemplary embodiment of the invention, at least one spring may be arranged between the housing and a radial surface of the plate member, wherein the spring exerts a force on the plate member in the radial direction of the shaft. The force exerted by the spring on the plate member may cause a contact between the plate member and the shaft. An electrical connection between the plate member and the shaft is therefore both possible in a contact region between the plate member and the shaft as well as in the gap between the shaft and the plate member which remains due to the difference in diameter between the opening of the plate member and the diameter of the shaft. The spring pushes the plate member towards the shaft so that a contact between the plate member and the shaft can also be maintained when bending of the shaft occurs.

According to embodiments of the invention, the shaft may comprise an electrically conductive wear ring on its outer circumference at the axial position of the at least one first conduction means. The provision of a wear ring surrounding the outer circumference of the shaft at the axial position of the at least one first conduction means avoids or at least mitigates the occurrence of damage or wear to the shaft which may occur over time due to the contact between the shaft and the at least one first conduction means. The application of the wear ring has the advantage that, in case of wear or damage to the wear ring, the wear ring can be replaced easily and the shaft remains undamaged or unaffected by wear, respectively. Of course, also between the shaft and the at least one second conduction means, a wear ring can be provided if necessary.

In an exemplary embodiment of the invention, the plate member may comprise at least one electrically insulating distance member, in particular a roller or a sliding shoe, which is in contact with the shaft, wherein the plate member is kept in contact to or slightly separated from the shaft. In particular, the distance member may be arranged on the same circumferential position as the spring, so that either a gap between the plate member and the shaft is maintained or that a contact between the plate member and the shaft is maintained.

In an exemplary embodiment of the invention, the first conduction member may comprise at least one brush contact, in particular a spring-loaded brush contact, which is arranged at least partially in between the circular opening of the plate member and the shaft, wherein the at least one brush contact is electrically connected to the plate member and in direct contact with the shaft.

By the brush contact, a sliding electrical contact to the shaft is formed. This has the advantage that no voltage for bridging an air gap between the plate member and the shaft is needed, so that a current may flow directly in the cage section of the housing. Also by using spring-loaded brush contacts, a compensation of bending of the shaft is possible, since, due to the spring loading of the brush contact, contact between the brush contact and the shaft is maintained even if the shaft is bent during operation of the wind turbine. The combination of the plate member and the at least one brush contact may reduce the self-induction of the first conduction means compared to the sole usage of brush contacts between cage section and shaft. Also, the usage of a flexible member, as previously described, is not necessary and the plate member can be directly attached to the housing. In particular, the first conduction member comprises a plurality of brush contacts, for instance 8 to 12 brush contacts. The brush contacts are arranged uniformly around the shaft.

In an exemplary embodiment of the invention, the plate member may consist of a plurality of segments, in particular four ring-segments, attached to each other and/or that the plate member comprises a tapered edge around the circular opening. A plate member, which consists of a plurality of segments, can be easily mounted to the cage section of the housing. For example, four segments, which each cover 90 degrees of the circumference of the shaft, can be used. Of course, also any other number of, especially equally-shaped, segments is possible. A tapered edge around the circular opening reduces the contact area between the shaft and the plate member and may therefore reduce the wear to the shaft or the wear ring, respectively. Also, the tapered edge increases the field strength between the plate member and the shaft, or the wear ring, respectively, so that a flash over, or a bridging of the spark gap, respectively, is initiated at a lower voltage compared to a non-tapered edge since an electrical field strength is increased around sharp edges.

According to embodiments of the invention, the wear ring may be made of a material different than the first conduction means or of a portion of the first conduction means arranged adjacently to the wear ring. In particular, the wear ring is made of a material different from the material of a plate member or a brush contact of the first conduction means. For instance, the wear ring can be made of steel and the plate member can be made of aluminium or vice versa. It is also possible that a wear ring consists of aluminium or steel and one or more brush contacts made of a metal graphite mixture are used. The usage of two different materials for the wear ring and for the at least one first conductions means, or for the portion of the first conduction means, which is arranged adjacently to wear ring, avoids welding of the wear ring to the first conduction means during conduction of a lightning-induced current.

In an exemplary embodiment of the invention, the second conduction means may comprise at least one brush contact, in particular a spring-loaded brush contact, which is electrically connected to the cage section of the housing and in direct contact with the shaft. It is possible that a plurality of spring brushes is used as second conduction means. The spring-loaded brush contacts used as second conduction means can be arranged directly between the cage section of the housing and the shaft.

In an exemplary embodiment of the invention, it may be provided that the second conduction means has a resistance which is higher than a resistance of the first conduction means. Providing a second conduction means with a higher resistance than the first conduction means causes a dampening of a current which is oscillating between the shaft and the housing. Also, a termination of the current path through the segment of the shaft can be terminated avoiding or reducing a reflection of the current at the end of the shaft opposite to the hub. Also, a second conduction means with a self-induction higher than the self-induction of the first conduction means can be tolerated if the resistance of the second conduction means is higher as well.

In an exemplary embodiment of the invention, the at least one bearing may be a sliding bearing, wherein in particular a pair of sliding bearings is arranged axially separated from each other on the segment of the shaft. Of course, also an arrangement of three or more bearings between the segment of the shaft and the electrically conductive cage sections of the housing is possible.

BRIEF DESCRIPTION

Some of the embodiments will be described in detail, with reference to the following figures, wherein like designations denote like members, wherein.

DETAILED DESCRIPTION

Figure 1:
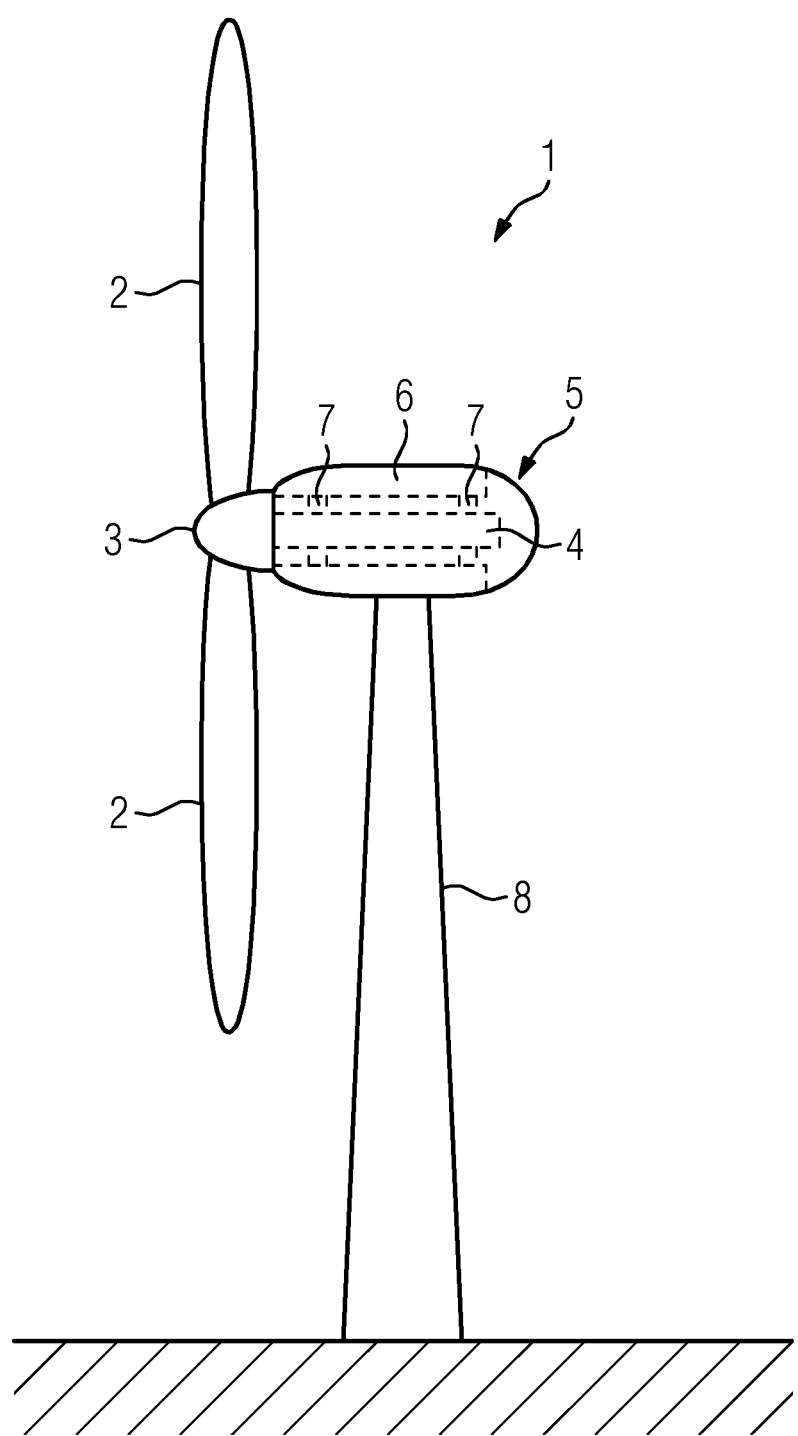
FIG. 1 shows a schematic side view of a wind turbine according to the invention.
Figure 4:
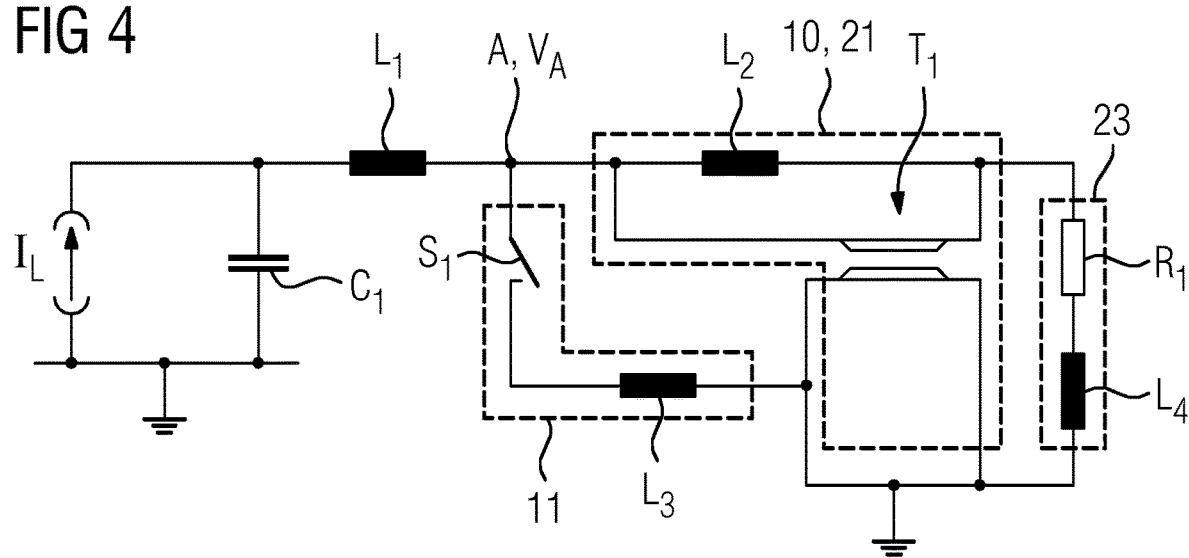
FIG. 4 shows an equivalent circuit diagram of a wind turbine according to the invention.

In FIG. 1, a schematic side view of a wind turbine 1 according to embodiments of the invention is shown. The wind turbine 1 comprises a plurality of rotor blades 2 which are attached to a hub 3 of the wind turbine 1. The hub 3 is connected to a shaft 4 located in a nacelle 5 of the wind turbine 1. The wind turbine 1 comprises a housing 6 on which the shaft 4 is supported by two bearings 7. The bearings 7 can be, for instance, sliding bearings. The nacelle 5 of the wind turbine 1 is arranged on a tower 8 of the wind turbine 1. The housing 6 can be part of the nacelle 5. A more detailed view on the shaft 4 and the housing 6 is shown in FIG. 2 or FIG. 4, respectively.

Figure 2:
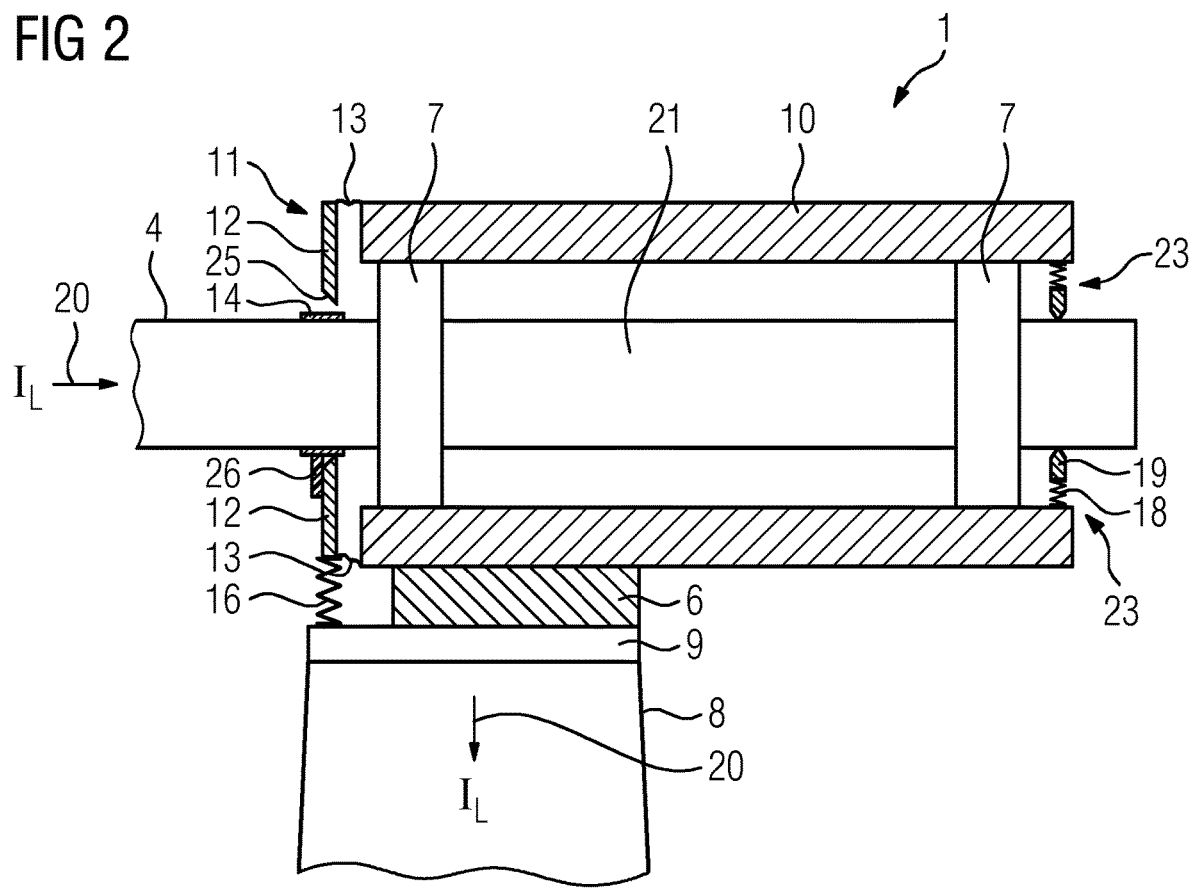
FIG. 2 shows a schematic side view of a first embodiment of a wind turbine according to the invention.

FIG. 2 shows a schematic side view of a wind turbine 1 according to embodiments of the invention. The housing 6 is supported by a bedframe 9 to the tower 8 of the wind turbine 1. The housing 6 comprises an electrically conductive cage section 10 which is connected to the shaft 4 by a first conduction means 11 and a plurality of second conduction means 23 and surrounds a segment 21 of the shaft 4. The shaft 4 is supported against the cage section 10 of the housing 6 by the two bearings 7.

Figure 3:
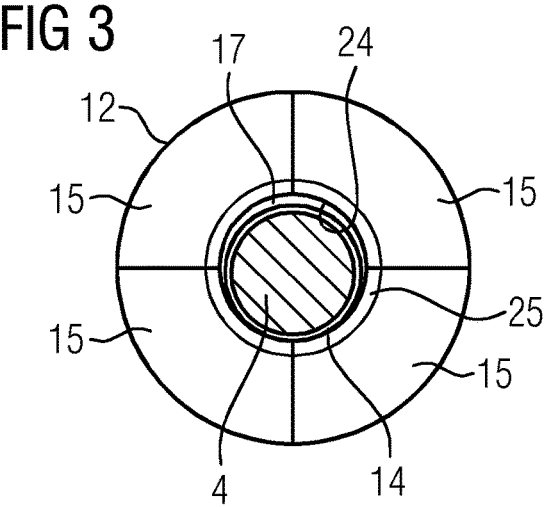
FIG. 3 shows a front view of the first embodiment of a wind turbine according to the invention.

The first conduction means 11 comprises a plate member 12, which is fixated to the cage section 10 of the housing 6 by a flexible member 13, which is electrically conductive and consists of a metal mesh or a flexible metal membrane. As can be seen from FIG. 3, which depicts a front view on the first conduction member 11, the plate member 12 has a circular shape and comprises a circular opening 24 with a diameter larger than the diameter of the shaft 4, partly forming a gap 17 around the shaft 4. The shaft 4 comprises a wear ring 14 at the axial position of the first conduction means 11. The flexible member 13 is arranged on the outer circumference of the plate member 12 and connected to the cage section 10 of the housing 6, wherein the cage section 10 has a cylindrical geometry with a diameter corresponding to the outer diameter of the plate member 12. The plate member 12 is formed from four segments 15, which each cover 90 degrees of the outer circumference of the shaft 4. The four segments 15 are attached to each other forming the plate member 12. The plate member 12 consists of metal and comprises a tapered edge 25 around the circular opening to reduce the contact area between plate member 12 and the shaft 4 or the wear ring 14, respectively. Also, the tapered edge 25 of the plate member 12 may increase the electrical field strength between the first conduction means 11 and the shaft 4, or the wear ring 14, respectively, and therefore lowers the flash over voltage.

As is apparent from FIG. 2, between the plate member 12 and the housing 6, a spring 16 is arranged which exerts a force in a radial direction of the shaft 4 on a radial surface of the plate member 12. A distance member 26 is arranged on the plate member 12, wherein the distance member 26 maintains contact between the lower part of the plate member 12, on which the force of the spring 16 acts, and the shaft 4, even in case of a bending of the shaft 4 which may occur during the operation of the wind turbine 1. Due to the flexibility of both the spring 16 and the flexible member 13, a contact between the plate member 12 and the shaft 4 is maintained. The distance member 26 is electrically insulating and can be for instance a roller or a sliding shoe made of an insulating plastic material.

Alternatively, it is possible that no distance member 14 and no spring 16 are used, and that the plate member 12 is not pushed towards the shaft 4, so that in normal operation, a gap 17 is formed on the entire circumference of the shaft 4 between the shaft 4 and the plate member 12. However, in the depicted embodiment, because of the spring 16, the gap 17 is formed due to the difference in the diameters of the circular opening 24 of the plate members 12 and the shaft 4 only on a portion of the circumference of the shaft 4 between the shaft 4 and the plate member 12.

The second conduction means 23 are provided as spring-loaded brush contacts comprising a spring 18 and a brush contact 19 and connecting the cage section 10 of the housing 6 to the shaft 4. The bearings 7 are arranged each at an axial position in between the axial position of the first conduction means 11 and the axial position of the second conduction means 23.

In case of the occurrence of a lightning-induced current $I_L$, as symbolized by the arrows 20, part of the current can flow through the first conduction means 11 into the cage section 10 of the housing 6. The gap 17 between the first conduction means 11 and the shaft 4, or the wear ring 14 of the shaft 4, respectively, forms a spark gap which becomes electrically conductive at a certain voltage difference between the shaft and the first conductions means 11. This breakdown voltage of the air in the gap 17, at which electrical conduction due to arcing occurs, can be, for instance, around 1 kV.

Due to the provision of the first conduction means 11, in case of a lightning current, an electrical connection between the shaft 4 and the cage section 10 is obtained, so that a part of the lightning current $I_L$ flows through the first conduction means 11 into the cage section 10. Of course, a part of the current will also flow through the shaft segment 21 surrounded by the cage section 10. The current remaining in the shaft 4 flows through the segment 21 of the shaft 4 and is grounded via the second conduction means 23 which establishes an electrical connection between the shaft 4 and the cage section 10 of the housing 6. The cage section 10 is grounded via the bedframe 9 and the tower 8.

The cage section 10 of the housing 6 as well as the first conduction means 11 and the second conduction means 23 form a Faraday cage around the segment 21 of the shaft 4, protecting the bearings 7 arranged in between since the segment 21 and the cage section 10 from high voltage differences in case of a lightning strike. Due to the electrical connection established by the first conduction means 11 and the second conduction means 12, the cage section 10 of the housing 6 works as a coaxial shell to the shaft 4. Because a fast changing magnetic field cannot penetrate this coaxial shell, a low transfer impedance of this coaxial assembly is achieved so that a current flowing in the cage section 10 will generate only a negligible voltage difference between the shaft 4 and the cage section 10 so that also the voltage dropping over the bearings 7 is low. Therefore, the bearings 7 are protected from damage induced by a lightning current resulting from a lightning strike.

Due to the plate member 12, the first conduction means 11 comprises a low self-induction. Consequently, a lightning current $I_L$, which quickly changes over time, or which has a large di(t)/dt, respectively, only causes a small voltage drop over the first conduction means 11 and therefore between the shaft 4 and the cage section 10 of the housing 6 during its propagation in the wind turbine 1.

The effect of protecting the bearings 7 can be understood regarding the equivalent circuit diagram of FIG. 4. In this diagram, $I_L$ is the current induced by a lightning strike, $C_1$ resembles the capacitance of the hub 3, $L_1$ is the induction of a portion of the shaft 4 between the hub 3 and the first conduction means 11, and node A represents the axial position of the first conduction means 11. The segment 21 of the shaft 4 and the cage section 10 of the housing 6 are described by the inductivity $L_2$ and the transmission line $T_1$, which is connected to the self-induction $L_3$ of the first conduction means 11. The cage section 10 is assumed to be on ground potential.

The at least one second conduction means 23 is described by a resistance $R_1$ and the inductivity $L_4$ connecting the segment 21 of the shaft 4 to cage section 10. A breakdown voltage of the gap 17 is described as a switch $S_1$, which closes at a breakdown voltage and establishes the electrical connection between the shaft 4 and the cage section 10 through the first conduction means 11. The breakdown voltage is a threshold of the voltage $V_A$ at node A, or the voltage of the shaft 4 at the axial position of the first conduction means 11, respectively.

Figure 5:
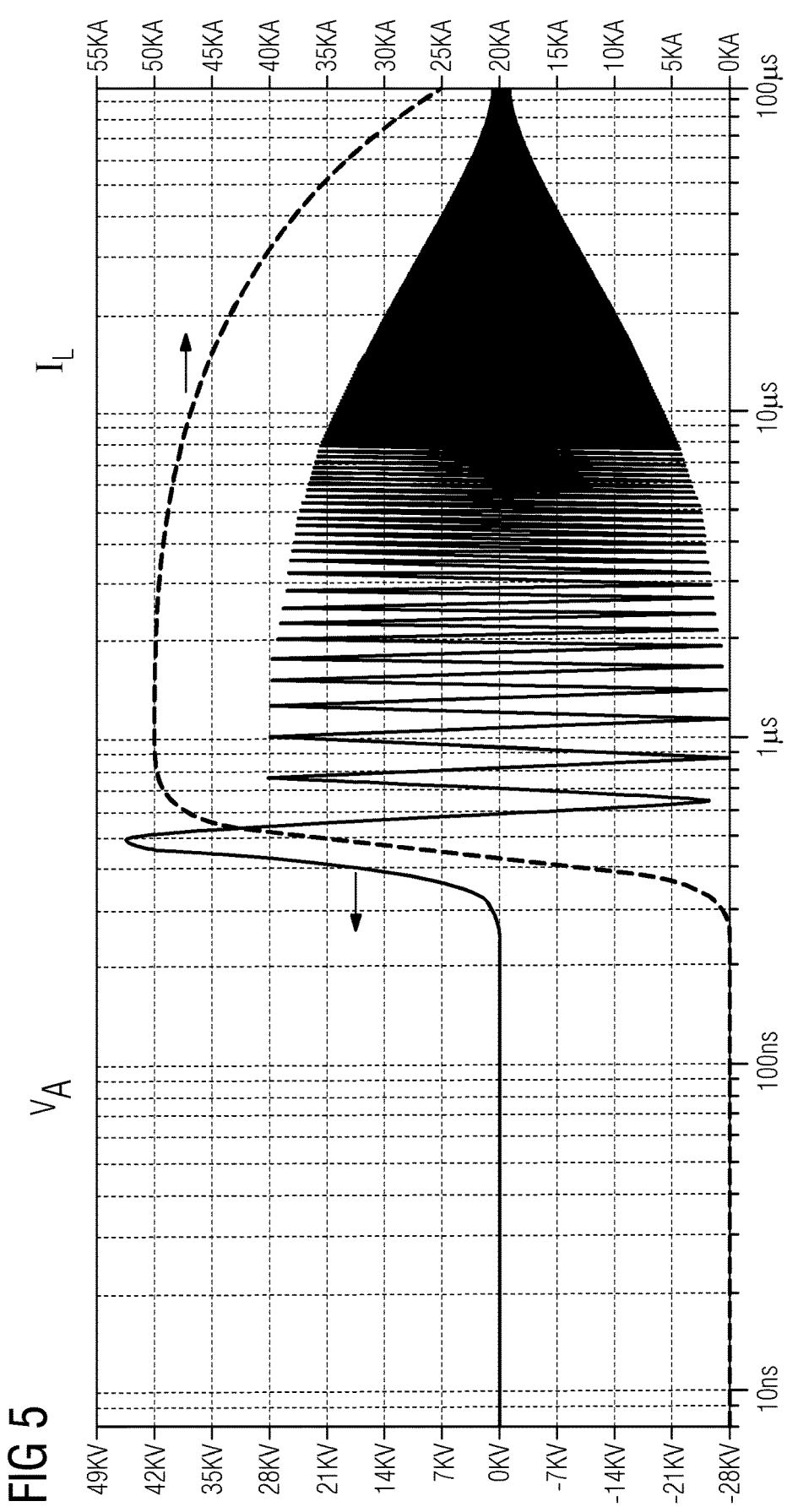
FIG. 5 shows a first diagram depicting time curves of voltage and current in the wind turbine during a lightning strike.

In FIG. 5, a first diagram created based on the equivalent circuit is shown. As a first curve, the lightning induced current Ii is shown and as a second curve, the voltage $V_A$ at the node A is depicted. For the components of the equivalent circuit, the following values are assumed: $C_1$=10 nF, $L_1$=50 nH, $L_2$=2μH, $R_1$=100 mΩ, $L_4$=75 nH. For the transmission line $T_1$, a transmission delay of 20 ns and a characteristic impedance of 20Ω are assumed. As breakdown voltage, a value of 1 kV is assumed. The curves in FIG. 5 were calculated using a self-induction of $L_3$=150 nH for the first conduction means.

Figure 6:
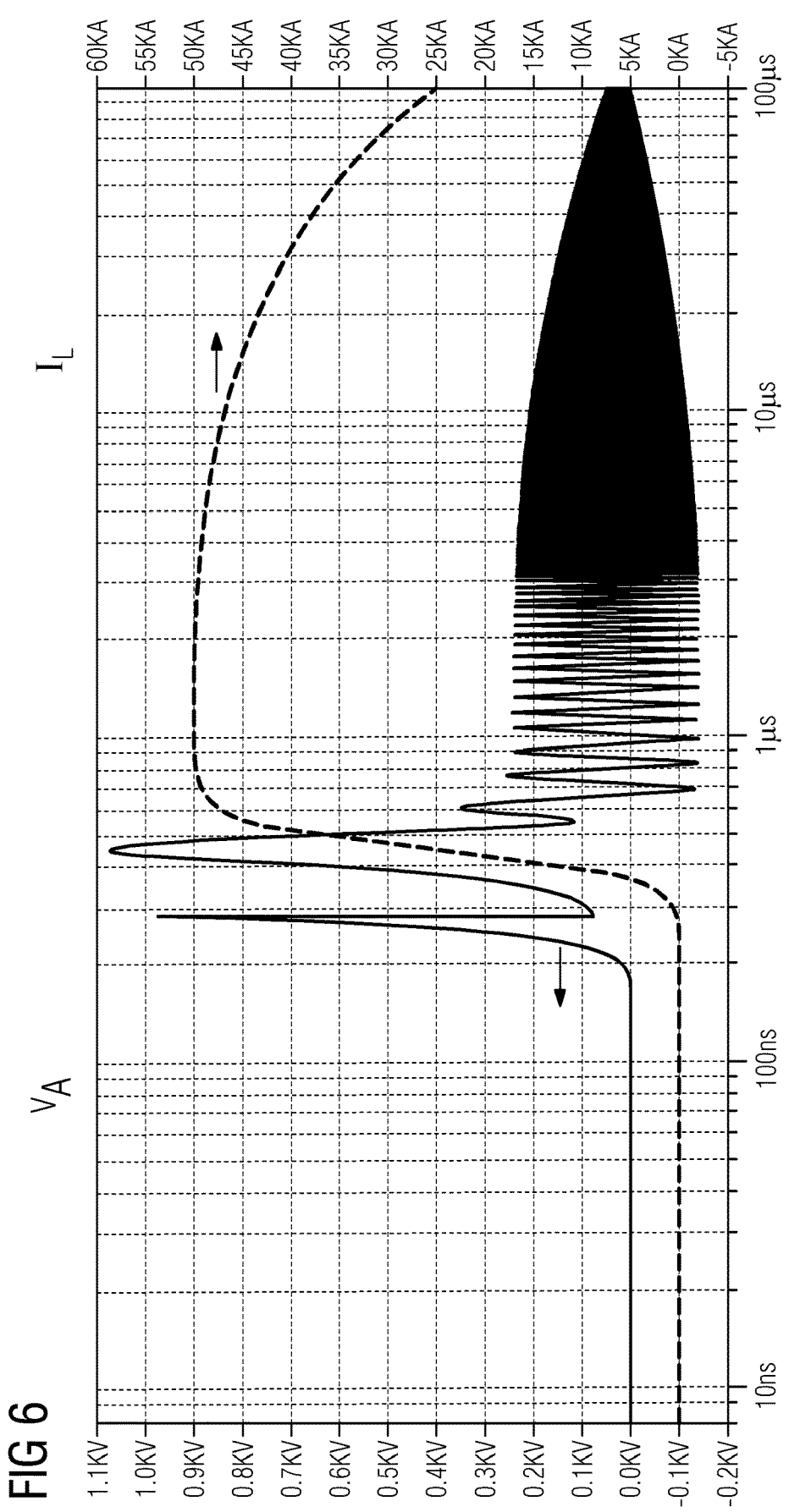
FIG. 6 shows a second diagram depicting time curves of voltage and current in the wind turbine during a lightning strike.

However, in FIG. 6, a self-induction of only $L_3$=3 nH is assumed for the first conduction means 11. From FIGS. 5 and 6, it becomes evident that a low self-induction of the first conduction means 11 significantly reduces the amplitude of the voltage $V_A$ at node A and therefore the voltage difference between the shaft 4 and the cage section 10 of the housing 6. Such a low self-induction of the first conduction means 11 can be achieved, for instance, by using the plate member 12 as previously described. It shall be noted that the value of the spark voltage may differ from the value of 1 kV, since it depends on both the width of the gap 17 and other parameters like air humidity and the like. Due to the small voltage difference between the shaft and the cage section 10 of the housing, which is achieved by the first connection means 11, the bearings 7 arranged between the shaft 4 and the cage section 10 of the housing are protected from damage induced by large current flow through the bearings 7.

Figure 7:
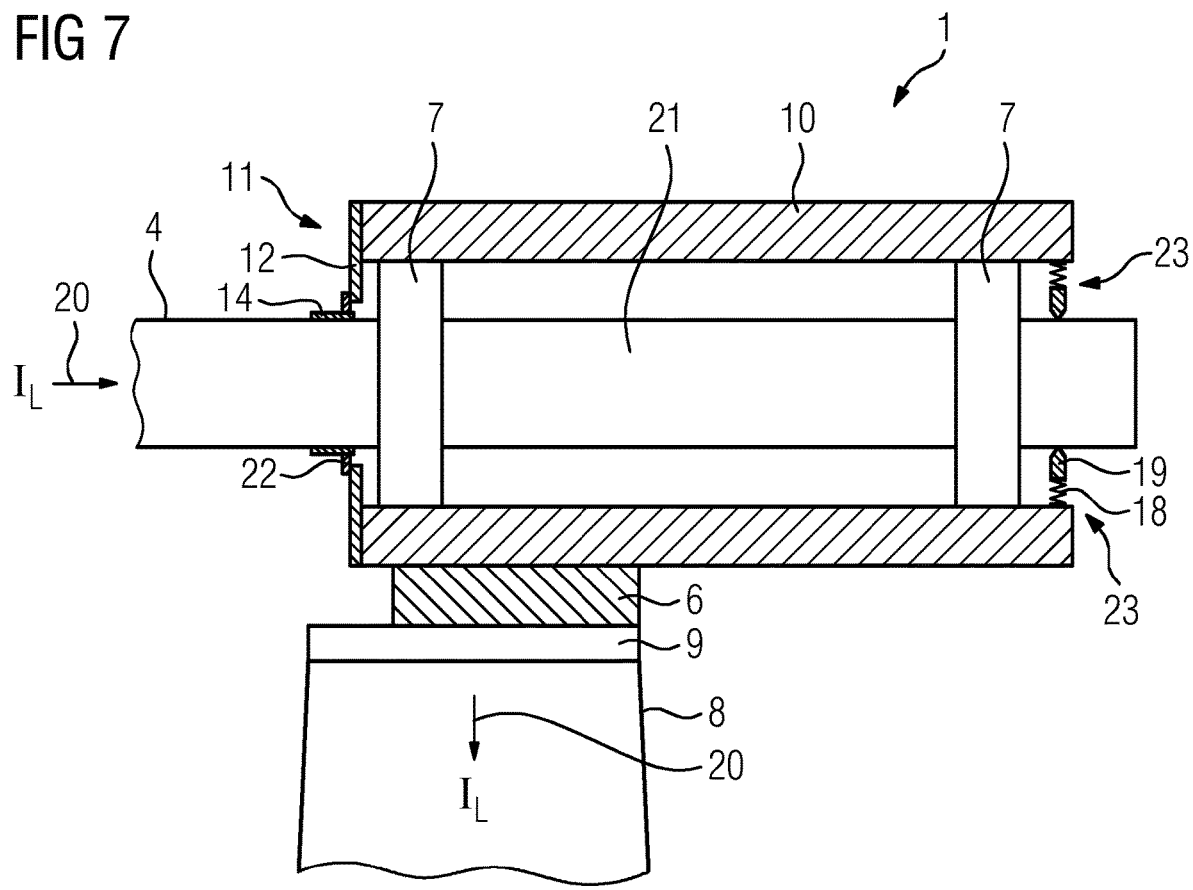
FIG. 7 shows a side view of a second embodiment of a wind turbine according to the invention.

A second embodiment of a wind turbine 1 is depicted in FIG. 7. This second embodiment differs from the first embodiment only regarding the first conduction means 11. The first conduction means 11 in the second embodiment comprises the plate member 12 as well as a plurality of spring-loaded brush contacts 22, which are arranged on the inner circumference of the plate member 12 contacting the shaft 4 at the axial position of the first conduction means 11. In this example, additionally, a wear ring 14 is provided between the first conduction means 11 and the shaft 4.

Figure 8:
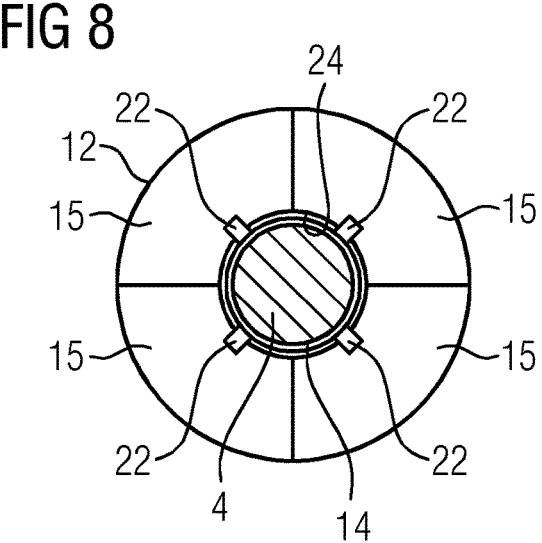
FIG. 8 shows a front view of the second embodiment of a wind turbine according to the invention.

A front view of the first conduction means 11, depicted in FIG. 8, shows the distribution of the spring-loaded brush contacts 22 around the shaft 4. Alternatively to the four spring-loaded brush contacts 22, also a different number like eight or twelve brush contacts 22 can be used. By using more brush contacts 22, the self-induction of the first conduction means 11 can be further reduced. Since the spring-loaded brush contacts 22 are capable of compensating a bending of the shaft 4, the plate member 12 is directly attached to the cage section 10 of the housing 6. Due to the direct contact between the brush contacts 22 of the first conduction means 11 and the shaft 4, no breakdown voltage for the gap 17 is required and the electrical connection between the shaft 4 and the cage section 10 by the first conduction means 11 is maintained at all times.

The wear ring 14 consists of a material which is different from the material of the plate member 12 or the brush contacts 22, respectively. The usage of different materials, for instance aluminium or steel for the wear ring 14 and a metal graphite mixture for the brushes 22 or, in the first embodiment, aluminium for the wear ring 14 and steel for the plate member 12, or vice versa prohibits a welding between the wear ring and the first conduction means 11. Of course, it is possible that no wear ring 14 is used and that the first conduction means is in direct contact to the shaft 4. In this case, the shaft 4 can be made of steel and the plate member 12 can be made of aluminium.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
   a hub connected to a rotatable shaft extending in an axial direction, and
   at least one bearing supporting the shaft against a housing,
   wherein the housing comprises an electrically conductive cage section, which surrounds at least partially an axial segment of the shaft,
   wherein the cage section is electrically connected to the shaft by at least one first conduction means and at least one second conduction means,
   wherein the at least one first conduction means and the at least one second conduction means are arranged spaced apart from each other in the axial direction, the at least one second conduction means comprising at least one brush contact or at least one spring-loaded brush contact,
   wherein the at least one bearing is arranged between the axial segment of the shaft and the cage section of the housing at an axial position in between the at least one first conduction means and the at least one second conduction means,
   wherein the at least one first conduction means comprises an electrically conductive plate member with a circular opening surrounding the shaft, wherein the circular opening comprises a diameter larger than a diameter of the shaft, so that at least partially a gap between the shaft and the plate member is formed,
   further wherein:
     an outer circumference of the plate member is attached to an electrically conductive flexible member, wherein the flexible member is attached to the cage section of the housing, and/or
     at least one spring is arranged between the housing and a radial surface of the plate member, wherein the at least one spring exerts a force on the plate member in a radial direction of the shaft.

2. The wind turbine according to claim 1, wherein the electrically conductive flexible member; comprises a flexible metal membrane or a flexible metal mesh.

3. The wind turbine according to claim 1, wherein the plate member comprises at least one electrically insulating distance member which is in contact with the shaft, wherein the plate member is kept in contact with or slightly separated from the shaft.

4. The wind turbine according to claim 3, wherein the at least one electrically insulating distance member comprises a roller or a sliding shoe.

5. The wind turbine according to claim 1, wherein the at least one first conduction means comprises at least one spring-loaded brush contact which is arranged at least partially in between the circular opening of the plate member and the shaft, wherein the at least one spring-loaded brush contact of the at least one first conduction means is electrically connected to the plate member and in direct contact with the shaft.

6. The wind turbine according to claim 1, wherein the plate member comprises a plurality of segments, attached to each other and/or the plate member comprises a tapered edge around the circular opening.

7. The wind turbine according to claim 1, wherein the shaft comprises an electrically conductive wear ring on an outer circumference thereof at an axial position of the at least one first conduction means.

8. The wind turbine according to claim 7, wherein the wear ring is made of a material different than the at least one first conduction means or of a portion of the at least one first conduction means arranged adjacently to the wear ring.

9. The wind turbine according to claim 1, wherein the at least one second in direct contact with the shaft.

10. The wind turbine according to claim 1, wherein the at least one second conduction means has a resistance, which is higher than a resistance of the at least one first conduction means.

11. The wind turbine according to claim 1, wherein the at least one bearing is a sliding bearing.

12. The wind turbine according to claim 1, wherein the at least one bearing includes a pair of sliding bearings arranged axially separated from each other on the axial segment of the shaft.

13. The wind turbine according to claim 1, wherein the plate member comprises four ring segments attached to each other.

14. A wind turbine comprising:
   a hub connected to a rotatable shaft extending in an axial direction, and
   at least one bearing supporting the shaft against a housing, wherein the housing forms a nacelle of the wind turbine or is part of the nacelle of the wind turbine,
   wherein the housing comprises an electrically conductive cage section, which surrounds at least partially an axial segment of the shaft,
   wherein the cage section is electrically connected to the shaft by at least one first conduction means and at least one second conduction means, the at least one second conduction means comprising at least one brush contact or at least one sping-loaded brush contact,
   wherein the at least one first conduction means and the at least one second conduction means are arranged spaced apart from each other in the axial direction,
   wherein the at least one bearing is arranged between the axial segment of the shaft and the cage section of the housing at an axial position in between the at least one first conduction means and the at least one second conduction means,
   wherein the at least one first conduction means comprises an electrically conductive plate member with a circular opening surrounding the shaft, wherein the circular opening comprises a diameter larger than a diameter of the shaft, so that at least partially a gap between the shaft and the plate member is formed,
   wherein the at least one first conduction means comprises at least one spring-loaded brush contact which is arranged at least partially in between the circular opening of the plate member and the shaft, and wherein the at least one spring-loaded brush contact of the at least one first conduction means is electrically connected to the plate member and in direct contact with the shaft.

* * * * *